Patented Aug. 7, 1951

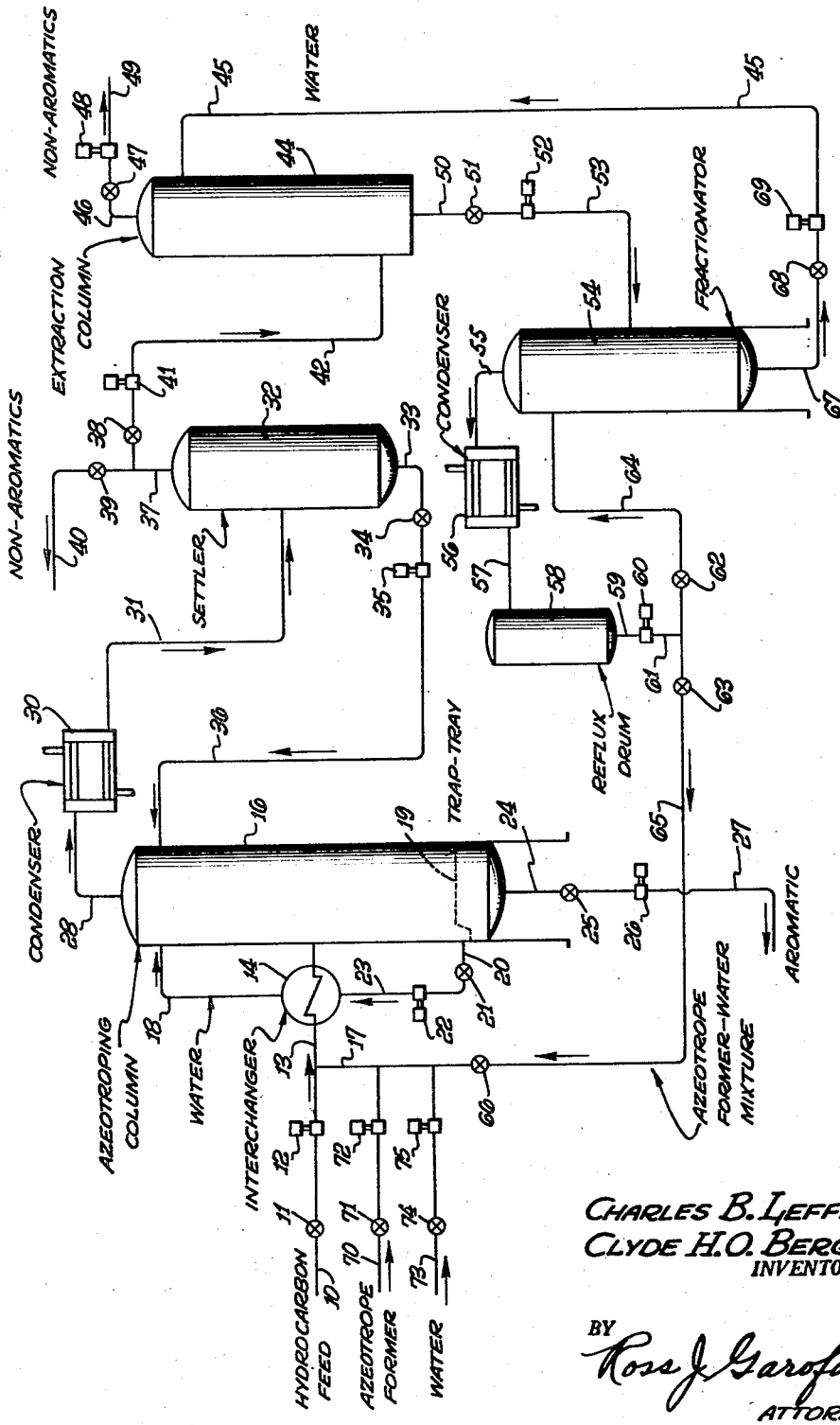

2,563,344

UNITED STATES PATENT OFFICE 2,563,344

AZEOTROPIC DISTILLATION OF HYDROCARBONS WITH AQUEOUS AZEOTROPE FORMERS

Charles B. Leffert and Clyde H. O. Berg, Long Beach, Calif., assignors to Union Oil Company of California, Los Angeles, Calif., a corporation of California Application July 6, 1945, Serial No. 603,560

10 Claims. (Cl. 202—42)

This invention relates to the process of azeotropic distillation and particularly to a modification of such process having the effect of materially increasing the capacity of normal azeotroping plants. This effect is brought about by a combination of azeotropic distillation and extractive distillation as herein set forth.

The process of separating one component from another component of substantially the same boiling point contained in a complex organic fraction by azeotropic distillation is well known. This process consists of distilling the fraction in the presence of an extraneous substance which has a preferential affinity for one of the components contained in the fraction thus causing a disturbance in the vapor pressure equilibrium that formerly existed in the fraction in such a manner that the partial vapor pressure or fugacity of at least one component within the fraction is changed sufficiently to permit its separation by controlled fractional distillation. Such an azeotroping process has found wide spread usage in the treatment of hydrocarbon fractions, alcohol-ketone mixtures, and the like, for the purpose of separating components of one structural type from components of another structural type. In such operation the azeotrope former employed has the effect of increasing the vapor pressure of the components of one structural type in the fraction, thus permitting their removal from the fraction, as an overhead distillate together with the azeotrope former. In the present description of our invention, the aforesaid type of distillation will hereinafter be referred to as "azeotropic distillation" and the overhead product or products consisting of the azeotrope former together with the component or components most affected by said azeotrope former will be herein after referred to as the "azeotropic distillate" while the residue remaining as bottoms in the azeotropic distillation will be referred to as "azeotropic bottoms."

For example, azeotropic distillation finds wide application in the separation of various components from petroleum distillates. Hydrocarbon mixtures from divers sources, such as crude oil, coal tar, shale oil, products from conversion of these materials such as hydroforming, cracking and the like, and products of synthesis such as the Fischer-Tropsch synthesis, etc., all generally contain aromatic hydrocarbons in small to very substantial proportions, but it has been found to be extremely difficult to separate pure aromatic hydrocarbon from any of these mixtures which contain appreciable amounts of non-aromatic hydrocarbons by simple fractional distillation because of the similarity in volatility of the aromatics and many of the non-aromatics present in the mixture. Azeotropic distillation of such mixtures with a suitable azeotrope-former, however, has been found to be an effective means of separation. For example, toluene of better than 99% purity, suitable for nitration to TNT, has been prepared from hydrocarbon mixtures of limited boiling range close to the boiling point of toluene, by distilling these mixtures in the presence of methyl ethyl ketone whereby the non-aromatic hydrocarbons present in the mixture form azeotropes with the methyl ethyl ketone. These azeotropes boil well below the boiling point of the toluene, which apparently forms no azeotrope with methyl ethyl ketone, and the non-aromatics and methyl ethyl ketone may be taken overhead in the distillation, leaving a bottoms fraction in which the toluene is concentrated. The efficiency of the fractionation equipment, i. e., the number of theoretical plates required for the azeotropic distillation in order to produce toluene of purity greater than 99%, is moderate, in the neighborhood of 40 to 60 plates, whereas by distillation of the same mixture without the azeotrope-former in a column having 150 plates it is doubtful if toluene of better than 90% purity could be obtained.

In carrying out azeotropic distillation on a commercial scale, it is necessary to have an efficient system for recovery of azeotrope former, since this is generally a relatively expensive commodity. This recovery is generally accomplished by processes involving extraction and distillation. For example, methyl ethyl ketone may be extracted from its solution in non-aromatic hydrocarbons with water, and the methyl ethyl ketone may then be separated from the water in the extract, by simple distillation. In this latter distillation when conducted at substantially atmospheric pressure, the methyl ethyl ketone forms an azeotrope with water, which contains about 10% of water. Separation of this azeotrope from the bottoms water fraction requires a distillation column of moderate efficiency and rather large diameter, since large volumes of water are necessary in the extraction step if efficient recovery of methyl ethyl ketone is to be attained. Similar considerations apply to azeotroping processes for recovering aromatics with azeotrope formers other than methyl ethyl ketone, and solvents other than water.

It is the primary object of our invention to effect separation of closely boiling components from a mixture by a combined process of azeotropic distillation and extractive distillation carried out simultaneously in which the extractive solvent is different from the azeotrope former employed in the distillation phase, and in this regard the process of our invention may be distinguished from other modified azeotropic distillation processes which employ an azeotrope former which is also a selective solvent for one of the components in the mixture.

It is a further object of our invention to accomplish the azeotropic distillation and a solvent extraction in the same fractionating column with the result that distillation and azeotrope former recovery equipment requirements are greatly reduced with the consequence that the capacity of presently employed plants may be materially increased.

Other objects and advantages of our invention will become apparent to those skilled in the art as the description thereof proceeds.

In azeotropic distillation the capacity of the distillation column is often limited by the overhead azeotropic composition. The azeotrope composition is the lowest boiling composition (in the case of minimum boiling azeotropes) in the system which the azeotrope overhead composition assumes. Since this composition is fixed at a given pressure, the capacity of the column determined by the vapor load is also fixed for a given operation at a given reflux ratio. If the amount of azeotrope former in the overhead or azeotropic distillate could be reduced from this composition without affecting the desired separation, the capacity of the column could thereby be increased and similarly the size of the recovering equipment for the azeotrope former would be reduced. It is to this end that our invention is directed and the following description of our process will be more readily understood with this in mind.

We have found for example in the azeotropic separation of non-aromatics from aromatics employing a water soluble, azeotrope former such as a ketone or an alcohol, that by circulating water through the column, the azeotropic distillate composition is enriched in non-aromatic components over and above the normal azeotrope composition. This effect is accomplished by introducing water to the column on the top plate, the water having been preheated to the temperature of that plate. The water is circulated through the column and is withdrawn from the bottom and again introduced at the top plate after interchanging with the incoming feed. This circulating stream of water recovers the azeotrope former from the azeotropic distillate by a process which may be compared both to extractive distillation and solvent extraction in that the non-aromatics are at least partially steam distilled at this point to compensate for the effect of extracting the azeotrope former therefrom. In this manner the overhead leaving the tower is enriched in non-aromatics as a result of the removal of a portion of the azeotrope former therefrom. Further by this process the azeotrope former tends to be concentrated in the center of the column.

We have found that circulating in this manner a volume of water equivalent to the volume of downflow in the column, if such water were not circulated, will permit as much as a 40% increase in the hydrocarbon feed and further will reduce the azeotrope recovery equipment by approximately 35%. The process is unique in that a water-non-aromatic hydrocarbon pseudo-azeotrope is formed to replace the azeotrope destroyed by the removal of the azeotrope former. As the excess water circulation is increased, the azeotrope former in the overhead decreases and the optimum condition results when the azeotrope former in the overhead has been reduced to only a trace by the use of sufficient circulating water. In such an operation substantially no azeotrope former is required in the feed inasmuch as it remains practically completely in the column.

The essence of our invention resides in the equilibriums established in the combined azeotrope and extractive distillation column. Upon examination of the ternary system non-aromatics (B. P. 200° F.–230° F.)-methyl ethyl ketone-water, for example, it is found that a minimum boiling azeotrope is formed, comprising approximately 21 volume per cent. non-aromatics, 71 volume per cent. methyl ethyl ketone and 8 volume per cent. water, boiling at approximately 165° F. Further it is well known that the presence in the ternary system of an excess of any of these components will not change the composition of the azeotrope obtained upon distillation of the system. Thus the addition of large quantities of water with the hydrocarbon feed and methyl ethyl ketone to an azeotroping column will have no effect upon the composition of the azeotrope distillate and will serve only to increase the liquid load in the column. We have found, however, that by introducing water at the top of the azeotroping column whereby it passes downwardly in the column being withdrawn at the bottom and recirculated to the top that it is possible to shift the vapor composition of the azeotropic distillate by a process which may be considered as extractive distillation in the direction of non-aromatic enrichment and methyl ethyl ketone impoverishment which is equivalent to a shift in the ternary diagram of the system toward the non-aromatic-water binary. Therefore, by increasing the amount of water circulated through the column new tie lines are encountered which when projected to the vapor line of the system are seen to result in a vapor composition materially higher in non-aromatics and at least slightly higher in water content with a corresponding decrease in methyl ethyl ketone content. Attendant with this change in overhead composition is an increase in the vapor temperature of the overhead corresponding in this case to the maximum incremental rise of the difference between 165° F. (boiling point of the ternary azeotrope) and 180° F. (temperature of steam distillation of the non-aromatics). It is therefore necessary in the operation of our process to maintain a temperature gradient throughout the azeotroping column at a higher level than would be required for the simple azeotropic distillation. However, it should be pointed out that the heat load of the column is not increased to any large extent inasmuch as the increase must be attributed to the increased water evaporation in the column which is shown to be surprisingly small.

In one example a toluene containing hydrocarbon fraction boiling between 200° F. and 235° F. was introduced into an azeotroping column together with a volume of methyl ethyl ketone-water azeotrope sufficient to separate the non-aromatics from the toluene. Water was introduced on the top tray of the column in an amount equivalent to the normal down flow in the column which resulted in a partial extractive distillation and an overhead distillate comprising 30.4 volume per cent. non-aromatics, 61.1 volume per cent. methyl ethyl ketone and 8.5 volume per cent. water. The value of our invention may be observed from these data which show a 41 per cent. increase in the non-aromatics in the overhead and a 13 per cent. decrease in methyl ethyl ketone from the ternary azeotrope which comprises 70.4 volume per cent. methyl ethyl ketone, 8.1 volume per cent. water and 21.5 volume per cent. non-aromatics. Further than this it is apparent that the vaporization of water in the column was not excessive inasmuch as the water content increased from 8.1 per cent. in the ternary azeotrope to only 8.5 per cent. in the overhead distillate from this run.

The water flowing down through the column is removed therefrom by a trap tray located at a point near the bottom of the column which tray has the effect of separating the water from the aromatic bottoms in the distillation. In this manner the water is withdrawn from the bottom of the column substantially free of methyl ethyl ketone and hydrocarbons and again recirculated to the top in an essentially closed system. The aromatic rich bottoms are continuously removed and the overhead distillate is separated into two phases, namely, a water-azeotrope former phase and a non-aromatic hydrocarbon-azeotrope former phase, the water phase being returned to the top of the column and the hydrocarbon phase being further extracted to remove the azeotrope former therefrom. If the water circulation is maintained sufficiently high to substantially eliminate the presence of azeotrope former in the overhead distillate, the non-aromatics resulting from this separation will be substantially pure and whether or not it is necessary to further extract traces of azeotrope former from these non-aromatics will be simply a matter of economics, but in any case the capacity of the equipment required will decrease with a decrease in the amount of azeotrope former in the overhead.

Whereas the foregoing description of our invention has dealt primarily with the separation of aromatic-non-aromatic mixtures, the process is applicable to a wide range of azeotropic separations in that the major requirement for its usage is that the extractive solvent must be capable of forming a binary minimum boiling pseudo-azeotrope with the component to be taken overhead and therefore must be more soluble in the azeotrope former than in this component. It is important to emphasize that it is not necessary that the extractive solvent-non-aromatic binary mixture boil below the azeotrope former-non-aromatic azeotrope. This condition is clearly exemplified in the foregoing discussion in which it was shown that the more water circulated through the column, the higher would be the vapor temperature at the top of the column, ranging from the boiling point of the ternary azeotrope of 165° F. to the steam distillation temperature of the non-aromatics (180° F.). In this and other respects our invention is shown to be unrelated to a process of double azeotroping wherein a second azeotrope former is introduced near the top of the azeotroping column to effect the separation of the non-aromatics from the primary azeotrope former by forming with the non-aromatics a lower boiling azeotrope than that formed between the primary azeotrope former and the non-aromatics.

A further requirement in selecting an extractive solvent is that it must possess a higher boiling point than the azeotrope former employed to permit its circulation through the column. It is also desirable to employ a solvent which is immiscible with the bottoms fraction of the azeotropic distillation to permit its ready separation therefrom by a simple trap tray placed in the column. Although such a trap tray constitutes a simple and effective means of separating the extractive solvent from the bottoms fraction there is no intention to limit our invention to this method for it is also possible to affect this separation after removal of the solvent and the bottoms from the distillation. Further it is not necessary that the solvent be immiscible with the bottoms fraction inasmuch as they may be separated by other means such as distillation, solvent extraction or the like after removal of the mixture from the azeotroping column. After separation of such a mixture the solvent is recirculated to the top of the column in the same manner.

Water naturally suggests itself as the preferred solvent for usage in all those applications dealing with the azeotrope separation of hydrocarbon mixtures in which a water soluble azeotrope former is employed. However, other extractive solvents fulfilling the above requirements may replace the water if necessary or desired. Ethylene glycol, for example, will fulfill the above requirements in the azeotropic separation of benzene from non-aromatics of similar boiling point with acetone or methyl alcohol, although here again water appears to be the most satisfactory solvent.

Our invention may be more fully understood by reference to the accompanying process diagram. For the sake of clarity the drawing will be discussed on the basis of the azeotropic separation of a non-aromatic-aromatic fraction employing a water soluble azeotrope former. As an example of this type of separation would be the azeotropic distillation of a toluene non-aromatic fraction with methyl ethyl ketone or a benzene non-aromatic fraction with acetone or the like.

With reference to the drawing, hydrocarbon feed such as a hydrocarbon fraction boiling between about 200° F. to 235° F. containing toluene and non-aromatics is introduced into the system by means of line 10, controlled by valve 11 and is pumped by pump 12 through line 13 and interchanger 14, where it is interchanged with the circulating water, into column 16. The azeotrope former such as methyl ethyl ketone which may contain some water is introduced with the hydrocarbon feed by means of lines 17 and 13 and interchanged together with the hydrocarbon feed in interchanger 14. Water is introduced by means of line 18 to the top tray of azeotropic column 16, contacting the azeotrope former non-aromatic azeotrope distilling upwardly in the column, extracting therefrom a portion of the azeotrope former. The overhead temperature in such an operation will be about 180° F. some 15° F. above the boiling point of the normal methyl ethyl ketone-non-aromatics azeotrope. The temperature gradient in the column is therefore maintained at a higher level than in the case of a simple azeotropic distillation employing methyl ethyl ketone as the azeotrope former and is controlled so as to strip the extracted azeotrope former from the excess water at a point in the column below the point of feed introduction and the water in turn is separated from the aromatic bottoms by means of trap tray 19 whereby the water is withdrawn from the column by means of line 20 controlled by valve 21 and is pumped by pump 22 via line 23 through interchanger 14 where it is interchanged with the incoming feed and through line 18 back into column 16 at the top plate. The aromatic bottoms are withdrawn from column 16 by means of line 24 controlled by valve 25 and are pumped by pump 26 via line 27 to storage or further processing if desired or necessary.

The azeotropic distillate enriched in non-aromatics as a result of the extractive distillation taking place in the column in conjunction with the azeotropic distillation, is taken overhead by means of line 28 and is passed through condenser 30 and line 31 into settler 32. In settler 32 a phase separation takes place resulting in a non-aromatic-azeotrope former phase and a water-azeotrope former phase. The water-azeotrope former phase is removed from the bottom of settler 32 by means of line 33, controlled by valve 34, and is pumped by pump 35 through line 36 back into azeotrope column 16 entering the column at the top plate. The non-aromatic azeotrope former phase is withdrawn from the top of settler 32 by means of line 37 controlled by valves 38 and 29. In the preferred method of operation the reflux to column 16 will contain at least a portion of the non-aromatic phase. This may be simply accomplished by withdrawing from settler 32 a quantity of condensate in excess of the proportion of the water phase in the total condensate. This method of operation is indicated in view of the fact that the water-azeotrope former phase represents only a small proportion of the total overhead which will be insufficient in itself to furnish the optimum reflux conditions.

If a sufficient quantity of water is circulated through azeotrope column 16 to remove substantially all of the azeotrope former from the azeotropic distillate resulting in a non-aromatic water-distillate only, the lower phase in settler 32 will comprise essentially pure water which may be reintroduced to column 16 as described, and the upper phase will comprise essentially pure non-aromatics which may not require any further refining. If such be the case the non-aromatics withdrawn from the top of settler 32 by means of line 37 will be passed through valve 39 and line 40 to storage.

On the other hand, if the operation of azeotrope column 16 is such that a substantial proportion of azeotrope former remains in the overhead, this azeotrope former will be distributed between the two phases in settler 32, that in the lower phase being recirculated to the column and that in the non-aromatic phase will be separated therefrom as follows: The non-aromatic-azeotrope former mixture is removed from the top of settler 32 by means of line 37 through valve 38 and is pumped by pump 41 via line 42 into the extraction column 44. Water is introduced by means of line 45 into extraction column 44 and the water soluble azeotrope former is extracted from the non-aromatics which are taken overhead from column 44 by means of line 46, controlled by valve 47 and then pumped by pump 48 through line 49 to storage.

The bottoms from extraction column 44 comprising a mixture of azeotrope former and water are withdrawn therefrom by means of line 50 controlled by valve 51 and are pumped by pump 52 via line 53 into fractionator 54. In fractionator 54 at least a partial separation of the water and azeotrope former is accomplished. In this regard the formation of an azeotrope between water and the azeotrope former, such as occurs for example when methyl ethyl ketone is the azeotrope former, will prevent the complete separation of the water therefrom. This does not effect the process of our invention inasmuch as the water may be introduced with the azeotrope former into azeotrope column 16 without deleterious effect. Further than this it may be desired for economic reasons to operate fractionator 54 less efficiently so that a higher percentage of water will be present in the overhead than normally appears in the azeotropic mixture. The overhead distillate from column 54 which as described above may comprise azeotrope former, the azeotropic mixture of azeotrope former and water or even a water-azeotrope former mixture in which the water is present in excess of that present in the azeotrope mixture is taken overhead by means of line 55 and is condensed in condenser 56 passing therefrom through line 57 into reflux drum 58. The condensate is withdrawn from reflux drum 58 by means of line 59 and is pumped by pump 60 into line 61 controlled by valves 62 and 63 and may thereby be split into two streams, a part thereof being returned through valve 62 and line 64 to column 54 to serve as reflux in the distillation. The remaining portion is passed through valve 63 and line 65 through valve 66 and line 17 into the hydrocarbon feed line 13. The botoms from the distillation in fractionator 54 comprising essentially pure water are withdrawn from the column by means of line 67 controlled by valve 68 and are pumped by pump 69 through line 45 back to extraction column 44 to effect extraction of the azeotrope former from the non-aromatics as described.

Means are also provided for adding make up azeotrope former to the system by means of line 70 controlled by valve 71 introduced into the system by pump 72 and for the addition of make up water by means of line 73 controlled by valve 74 introduced into the system by pump 75.

We have found that the inclusion of an intercooler in column 16 greatly adds to the capacity thereof. For best results the intercooler is located at a point intermediate between the feed tray and the top tray where it has the effect of refluxing the non-aromatic-azeotrope former azeotrope. In this manner more efficient separation is realized at increased throughputs by insuring the maintenance in the column, at a point below the top, of a temperature gradient corresponding to the normal azeotropic distillation gradient which in the absence of the intercooler, will not be attained in the presence of the excess water flowing through the column. Further, if this modification is employed it may be desirable to include a steam coil immediately above the intercooler to reheat the vapors to equilibrium temperatures.

Whereas, as pointed out above, the process of our invention is applicable to a wide range of azeotropic separations the only requirement being that the extractive solvent be capable of forming a binary azeotrope or psuedo azeotrope with the component to be taken overhead. We have found that the process finds particular application in the separation of various hydrocarbon components in a petroleum distillate. Thus we have been able to materially increase the capacity of an azeotrope column for the separation of aromatics from non-aromatics with water soluble azeotrope formers such as the various ketones including acetone, methyl ethyl ketone, diethyl ketone, methyl isopropyl ketone and the like, alcohols such as methyl alcohol, ethyl alcohol, propyl alcohol, isopropyl alcohol, and the like, glycols such as ethylene glycol, propylene glycol and the like and in general any water soluble azeotrope former which may be employed in the separation of relatively unsaturated hydrocarbons from relatively saturated hydrocarbons. More specifically we have employed this method in the azeotropic distillation of a toluene-non-aromatic hydrocarbon fractions employing methyl ethyl ketone as the azeotrope former and in the azeotropic distillation of benzene-non-aromatic hydrocarbon fractions employing acetone as the azeotrope former. The process is equally applicable in the separation of other non-aromatic-aromatic fractions as well as in the azeotropic separation of other hydrocarbon mixtures such as paraffins from olefins and naphthenes from olefins, and further in the azeotropic separation of sulfur compounds from petroleum hydrocarbons.

Having described and illustrated the process of our invention and realizing that many modifications thereof may occur to those skilled in the art without departing from the spirit or scope of the invention, we claim:

1. A method of treating a mixture of aromatic hydrocarbon of the class consisting of benzene and toluene and non-aromatic hydrocarbons boiling in the same temperature range to separate the non-aromatic hydrocarbons from the aromatic hydrocarbon contained therein which comprises distilling said mixture in a fractionating zone in the presence of a sufficient amount of an azeotrope former of the class consisting of alcohols and ketones boiling below the boiling point of water to vaporize substantially all of said non-aromatic hydrocarbons as an azeotrope of said non-aromatic hydrocarbons and azeotrope former thereby leaving aromatic hydrocarbon as distillation residue, introducing water at the top of the fractionating zone, said water being at the temperature of the top of said fractionating zone in an amount sufficient to extract at least a part of said azeotrope former from the vaporized azeotrope in said fractionating zone and maintaining a temperature in said fractionating zone above that required to distill said azeotrope thereby permitting the removal of an overhead distillate containing at least some of said water and having a higher proportion of non-aromatic hydrocarbons and a lower proportion of azeotrope former than is normally present in said azeotrope, said amount of water introduced being sufficient to permit removal of water from the bottom of the fractionating zone.

2. A method according to claim 1 in which said azeotrope former is acetone.

3. A method according to claim 1 in which said azeotrope former is methyl ethyl ketone.

4. A process for separating an aromatic hydrocarbon of the class consisting of benzene and toluene from non-aromatic hydrocarbons boiling in the same temperature range which comprises distilling in a fractionating zone a mixture of said aromatic and non-aromatic hydrocarbons in the presence of a sufficient amount of a water-soluble azeotrope former of the class consisting of alcohols and ketones having a boiling point below the boiling point of water to vaporize all of the said non-aromatic hydrocarbons together with said azeotrope former as an azeotrope, introducing water at the top of said fractionating zone and passing said water downwardly through said fractionating zone countercurrent to the upward flow of azeotropic vapors in said zone, the amount of water being sufficient to extract at least a part of the azeotrope former from the ascending vapors and to permit removal of water from the bottom of said fractionating zone, recycling the removed water to the top of said zone, said introduced water being at substantially the same temperature as the top of said fractionating zone, said process permitting the removal of an overhead distillate from the fractionating zone having a higher proportion of non-aromatic hydrocarbons and a lower proportion of azeotrope former than is normally present in said azeotrope, said overhead distillate containing a higher proportion of water than is normally present in the azeotropic distillate.

5. A process for the separation of an aromatic hydrocarbon of the class of benzene and toluene from non-aromatic hydrocarbons of similar volatility which comprises azeotropically distilling a narrow boiling mixture of said aromatic and non-aromatic hydrocarbons in a fractionating zone in the presence of a sufficient amount of a water-soluble azeotrope former of the class consisting of alcohols and ketones boiling below the boiling point of water to vaporize the non-aromatic hydrocarbons together with azeotrope former as an azeotropic distillate thereby leaving aromatic hydrocarbons substantially completely separated from non-aromatic hydrocarbons as a distillation residue, introducing water at the top of the fractionating zone, and at the temperature of the top of the fractionating zone, in an amount sufficient to extract at least a part of the azeotrope former contained in said azeotropic distillate thereby reducing the proportion of azeotrope former and increasing the proportion of non-aromatic hydrocarbons in the overhead distillate obtained from said fractionating zone.

6. A process for the separation of an aromatic hydrocarbon of the class consisting of benzene and toluene from a hydrocarbon mixture containing said aromatic hydrocarbon together with non-aromatic hydrocarbons of similar volatility which comprises distilling said hydrocarbon mixture in a fractionating zone in the presence of a sufficient amount of a water-soluble azeotrope former of the class consisting of alcohols and ketones boiling below the boiling point of water to form minimum boiling azeotropes with the non-aromatic hydrocarbons in said hydrocarbon mixture in the presence of water and to permit vaporization of substantailly all of the said non-aromatic hydrocarbons, thereby leaving aromatic hydrocarbon as a distillation residue, vaporizing within said fractionating zone an azeotrope consisting essentially of azeotrope former and non-aromatic hydrocarbons and contacting said vaporized azeotrope with water introduced at the top of said fractionating zone, and at the temperature of the top of said zone, in an amount sufficient to at least partially extract azeotrope former from said vaporized azeotrope, maintaining a temperature at the top of said fractionating zone sufficient to vaporize non-aromatic hydrocarbons together with water and a reduced amount of azeotrope former but insufficient to vaporize all of said water thereby permitting the withdrawal of an overhead distillate containing a higher proportion of non-aromatic hydrocarbons and a lower proportion of azeotrope former than is present in said vaporized azeotrope and containing water vapor and removing unvaporized water from the lower portion of the fractionating zone.

7. A process according to claim 6 in which said aromatic hydrocarbon is benzene and said azeotrope former is acetone.

8. A process according to claim 6 in which said aromatic hydrocarbon is toluene and said azeotrope former is methyl ethyl ketone.

9. A method according to claim 1 in which said aromatic hydrocarbon is toluene and said azeotrope former is methyl alcohol.

10. A method according to claim 1 in which said aromatic hydrocarbon is toluene and said azeotrope former is isopropyl alcohol.

CHARLES B. LEFFERT.
CLYDE H. O. BERG.

REFERENCES CITED

The following references are of record in the file of this patent:

UNITED STATES PATENTS

| Number | Name | Date |
| --- | --- | --- |
| 2,339,576 | Luten | Jan. 18, 1944 |
| 2,360,655 | Deanesly | Oct. 17, 1944 |
| 2,377,049 | Souders | May 29, 1945 |
| 2,375,478 | Lake | May 8, 1945 |
| 2,376,870 | Engel | May 29, 1945 |
| 2,386,755 | Spiers | Oc.t 16, 1945 |
| 2,388,040 | Clark | Oct. 30, 1945 |
| 2,400,654 | Petry | May 21, 1946 |
| 2,411,437 | Lake | Nov. 19, 1946 |

FOREIGN PATENTS

| Number | Country | Date |
| --- | --- | --- |
| 831,295 | France | May 30, 1938 |